US010593489B2

(12) United States Patent
Oomori et al.

(10) Patent No.: US 10,593,489 B2
(45) Date of Patent: Mar. 17, 2020

(54) PRESSING SWITCH MECHANISM AND WEARABLE CAMERA

(71) Applicant: Panasonic i-PRO Sensing Solutions Co., Ltd., Fukuoka (JP)

(72) Inventors: Yasuhito Oomori, Kanagawa (JP); Tatsuya Tobimatsu, Fukuoka (JP); Noboru Takada, Fukuoka (JP); Eiji Takahashi, Fukuoka (JP); Izumi Sato, Fukuoka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 0 days.

(21) Appl. No.: 15/884,035

(22) Filed: Jan. 30, 2018

(65) Prior Publication Data

US 2018/0240621 A1    Aug. 23, 2018

(30) Foreign Application Priority Data

Feb. 17, 2017    (JP) .................. 2017-028295

(51) Int. Cl.
*H01H 13/82* (2006.01)
*H01H 13/48* (2006.01)
*H04N 5/225* (2006.01)
*H01H 13/84* (2006.01)
*H01H 13/04* (2006.01)

(52) U.S. Cl.
CPC ............ *H01H 13/48* (2013.01); *H01H 13/84* (2013.01); *H04N 5/2252* (2013.01); *H01H 13/04* (2013.01); *H01H 2215/004* (2013.01); *H01H 2215/006* (2013.01); *H01H 2215/03* (2013.01); *H01H 2217/004* (2013.01); *H01H 2221/05* (2013.01); *H01H 2231/046* (2013.01)

(58) Field of Classification Search
CPC .. H01H 13/48; H01H 2215/004; H01H 13/04; H01H 2231/046; H04N 5/2252
See application file for complete search history.

(56) References Cited

U.S. PATENT DOCUMENTS

| 5,764,518 A * | 6/1998 | Collins ................. B25J 9/1617 700/95 |
| 7,369,045 B2 * | 5/2008 | Hansen ............... H02J 13/0075 333/24 R |
| 7,593,605 B2 * | 9/2009 | King .................. H04N 1/00244 382/313 |

(Continued)

FOREIGN PATENT DOCUMENTS

| JP | 2016-122115 | * 12/2014 |
| JP | 2016-122115 A | 7/2016 |

*Primary Examiner* — Philip P. Dang
(74) *Attorney, Agent, or Firm* — Seed IP Law Group LLP

(57) ABSTRACT

A pressing switch mechanism includes a housing, a board that is accommodated in the housing, a switch portion that is fixed to the board and generates a click feeling according to pressing a pressed portion in a direction approaching the board, and an operation plate which includes a bowl-shaped recessed surface that is recessed from a surface of the housing, of which an outer peripheral edge is supported by the housing, which is displaceably bent in the direction approaching the board, and in which a bottom wall portion of the recessed surface protruding inward the housing is in contact with the pressed portion.

16 Claims, 7 Drawing Sheets

(56) References Cited

U.S. PATENT DOCUMENTS

| | | | | |
|---|---|---|---|---|
| 7,671,493 B2* | 3/2010 | Takashima | ............... | B06B 1/045 |
| | | | | 310/12.16 |
| 7,812,860 B2* | 10/2010 | King | ..................... | G06F 17/218 |
| | | | | 348/210.99 |
| 9,143,638 B2* | 9/2015 | King | ................... | H04N 1/00334 |
| 9,211,691 B2* | 12/2015 | Honda | ............... | H01L 21/67092 |
| 9,291,936 B2* | 3/2016 | Taniguchi | ........... | G03G 15/0233 |
| 9,319,555 B2* | 4/2016 | King | ................... | G06F 16/5846 |
| 9,749,510 B2* | 8/2017 | Taniguchi | ............. | H04N 5/2254 |
| 9,820,658 B2* | 11/2017 | Tran | ...................... | A61B 5/0006 |
| 9,916,538 B2* | 3/2018 | Zadeh | .................... | G06N 7/005 |
| 10,110,805 B2* | 10/2018 | Pomerantz | .......... | H04N 5/23229 |
| 2012/0112859 A1* | 5/2012 | Park | .................... | G06F 3/03548 |
| | | | | 335/205 |
| 2014/0168130 A1* | 6/2014 | Hirai | ....................... | G10L 15/00 |
| | | | | 345/173 |
| 2015/0181351 A1* | 6/2015 | Sarow | .................. | A44C 5/0015 |
| | | | | 381/334 |
| 2016/0112636 A1* | 4/2016 | Yamaguchi | ......... | H04N 5/23245 |
| | | | | 348/158 |

* cited by examiner

PRESSING SWITCH MECHANISM AND WEARABLE CAMERA

BACKGROUND

1. Technical Field

The present disclosure relates to a pressing switch mechanism in which a switch is pressed by a user and a wearable camera including the pressing switch mechanism.

2. Description of the Related Art

In recent years, for example, in the United States, a difficulty of verifying the legitimacy of a response during regular patrolling of a police officer or a response at the time of an emergency dispatch request (for example, firing of a handgun) has been a problem. Therefore, during patrolling or emergency dispatch request, in order to accurately image a situation of a site as a destination of the police officer, and then use it for the verification of legitimacy of the response of the police officer, an operation of attaching a wearable camera on the police officer during patrolling or at the time of a support dispatch is promoted. A recording button for recording data of an image captured by the wearable camera is usually provided in the wearable camera worn by the police officer. The recording button is disposed on a front surface of a housing with a relatively large area in order to facilitate a pressing operation during emergency (for example, see Japanese Patent Unexamined Publication No. 2016-122115).

As described above, the police officer arriving at the site during regular patrolling, in response to an emergency dispatch request, or the like needs to press the recording button in order to record an image of the site which is used at the time of investigation by operating the wearable camera. However, in this case, for example, under urgent and tense situations, in the configuration disclosed in Japanese Patent Unexamined Publication No. 2016-122115, the police officer hardly knows whether or not the switch operation has appropriately been performed by the police officer (in other words, whether or not the recording button has been properly pressed by the police officer). Here, in order to easily describe the problem, the police officer is cited as an example of a user, the user is not limited to a police officer, but may be a security guard and it goes without saying that the user is also not limited to a police officer and a security guard.

SUMMARY

The disclosure is made in view of the above situations and an object thereof is to provide a pressing switch mechanism and a wearable camera, in which a click feeling and an operation sound are generated with high efficiency and a simple structure, and a user's difficulty in knowing whether or not a switch operation is performed is reduced under various situations.

The disclosure provides a pressing switch mechanism including: a housing; a board that is accommodated in the housing; a switch portion that is fixed to the board and generates a click feeling according to pressing a pressed portion in a direction approaching the board; and an operation plate which includes a bowl-shaped recessed surface that is recessed from a surface of the housing, of which an outer peripheral edge is supported by the housing, which is displaceably bent in the direction approaching the board, and in which a bottom wall portion of the recessed surface protruding inward the housing is in contact with the pressed portion.

In addition, the disclosure provides a wearable camera including a pressing switch mechanism and a capture that images an object.

According to the disclosure, a click feeling and an operation sound can be generated with high efficiency and a simple structure, and a user's difficulty in understanding whether or not a switch operation is performed can be reduced under various situations.

DETAILED DESCRIPTION

Hereinafter, exemplary embodiments in which a pressing switch mechanism and a wearable camera according to the disclosure are disclosed (hereinafter, referred to as the "exemplary embodiment") will be described in detail with reference to the drawings as appropriate. However, more detailed description than necessary may be omitted. There are cases where detailed descriptions of well-known matters and redundant descriptions on substantially the same configuration may be omitted. This is to avoid the unnecessary redundancy of the following description and to facilitate understanding by those skilled in the art. The accompanying drawings and the following description are provided to enable those skilled in the art to fully know the disclosure, and are not intended to limit the matters described in the claims.

Figure 1:
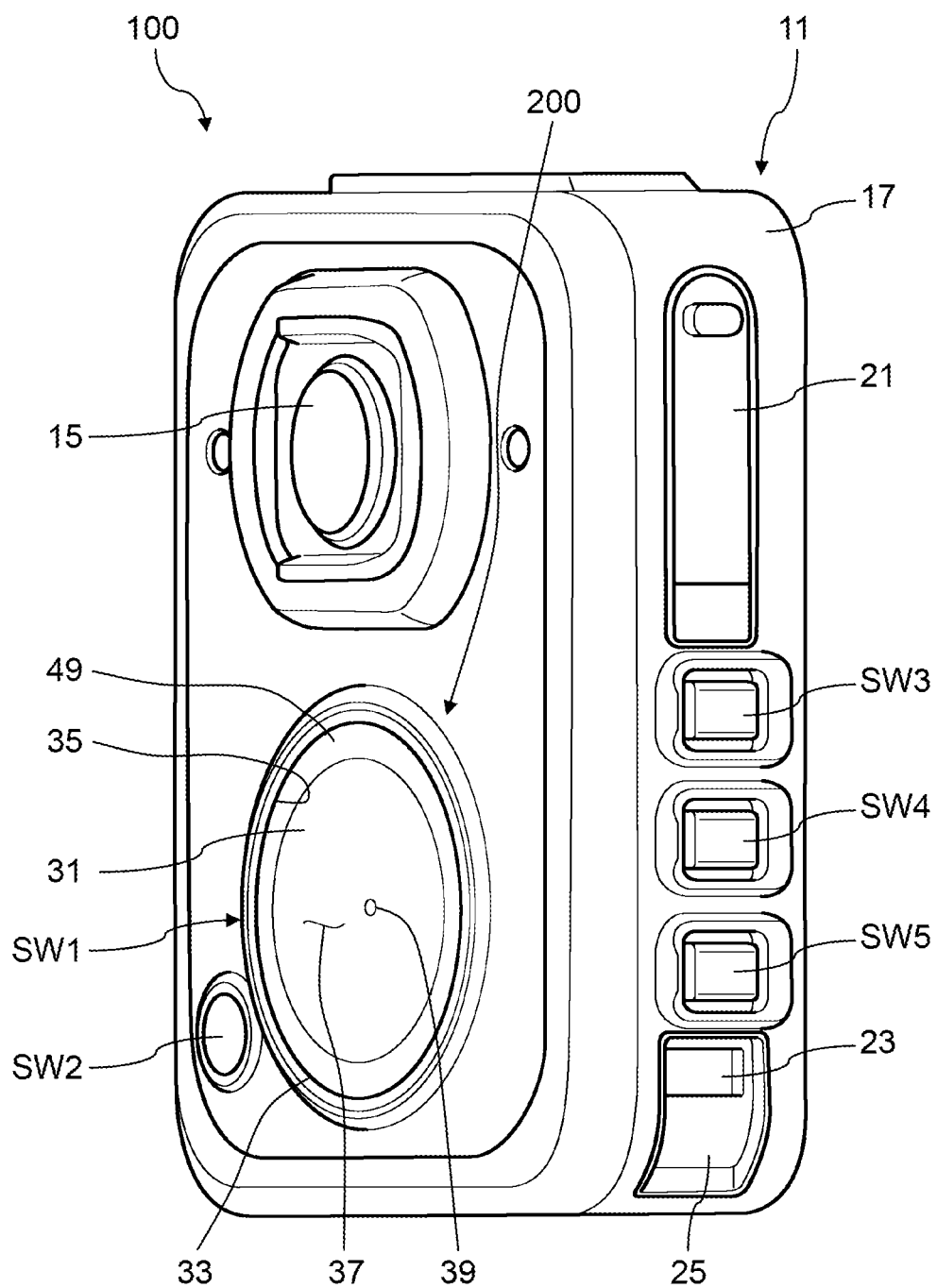
FIG. 1 is a perspective view of a wearable camera of an exemplary embodiment.

FIG. 1 is a perspective view of the wearable camera of the exemplary embodiment.

As an example of a user of wearable camera 100 according to the exemplary embodiment, a police officer will be described and wearable camera 100 will be described assuming a case where the police officer uses wearable camera 100 inside a police station or outside the police station. As described above, the user of wearable camera 100 is not limited to the police officer and may be used in various other offices (for example, a security company).

The use outside the police station includes a use during regular patrolling of the police officer, in response to an emergency dispatch request, or the like. The police officer wears wearable camera 100 to image an object (for example, a person or a vehicle related to an incident, a scene of a site, some trace of the site, or a group of people who are in the vicinity of the site concerning the incident). Wearable camera 100 transmits captured image data to a back end system in the police station directly or via an in-vehicle camera system (not illustrated) placed in a police vehicle (for example, a patrol car) on which the police officer rides, for example, depending on an operation of the police officer. The image data transmitted to the back end system is accumulated in a storage (not illustrated) of the back end system managed in the police station.

Wearable camera 100 is attached to clothes worn by the user or a body to be used so as to image an image of a visual field from a position close to a viewpoint of the user such as the chest of the police officer that is the user. In a case where wearable camera 100 is worn, the user operates recording switch SW1 to image an image of a surrounding object.

Wearable camera 100 is provided with imaging lens 15 of capture 13, recording switch SW1, and snapshot switch SW2 on a front surface of substantially rectangular parallelepiped housing 11. Imaging lens 15 is disposed in a substantially upper half region of the front surface. Recording switch SW1 is disposed in a substantially lower half region of the front surface. For example, recording (imaging of a moving image) is started by pressing recording switch SW1 an odd number of times and recording is completed by pressing recording switch SW1 an even number of times. Imaging of a still image is executed every time snapshot switch SW2 is pressed.

Wearable camera 100 accommodates capture 13 in housing 11 and exposes imaging lens 15 of capture 13 on the front surface. In housing 11, a surface opposite to the front surface is a back surface. The back surface becomes a surface in a direction along a vertical surface and becomes a surface on a side on which attachment is performed on the clothes or the like. Housing 11 is formed of front-surface housing 17 and rear cover 19 including the back surface.

Wearable camera 100 is provided with accessory connection 21, communication mode switch SW3, LED and vibration switch SW4, OFF switch SW5, and the like from an upper side on a right-side surface as viewed from the front surface of housing 11. In addition, housing 11 includes shaft portion 25 disposed at recessed portion 23 below OFF switch SW5. Both ends of shaft portion 25 are fixed to an opposite inner wall surface of recessed portion 23. An annular code formed at a base end of a strap is connected to shaft portion 25.

Recording switch SW1 is disposed in the lower half region on the front surface of housing 11 with a large area. In an emergency site, since there is no time to perform a complicated operation or to look for recording switch SW1, it is desirable that recording switch SW1 can be easily operated with one hand. Therefore, recording switch SW1 is disposed in the lower half region of the front surface of the housing with a large area, thereby improving operability.

Figure 2:
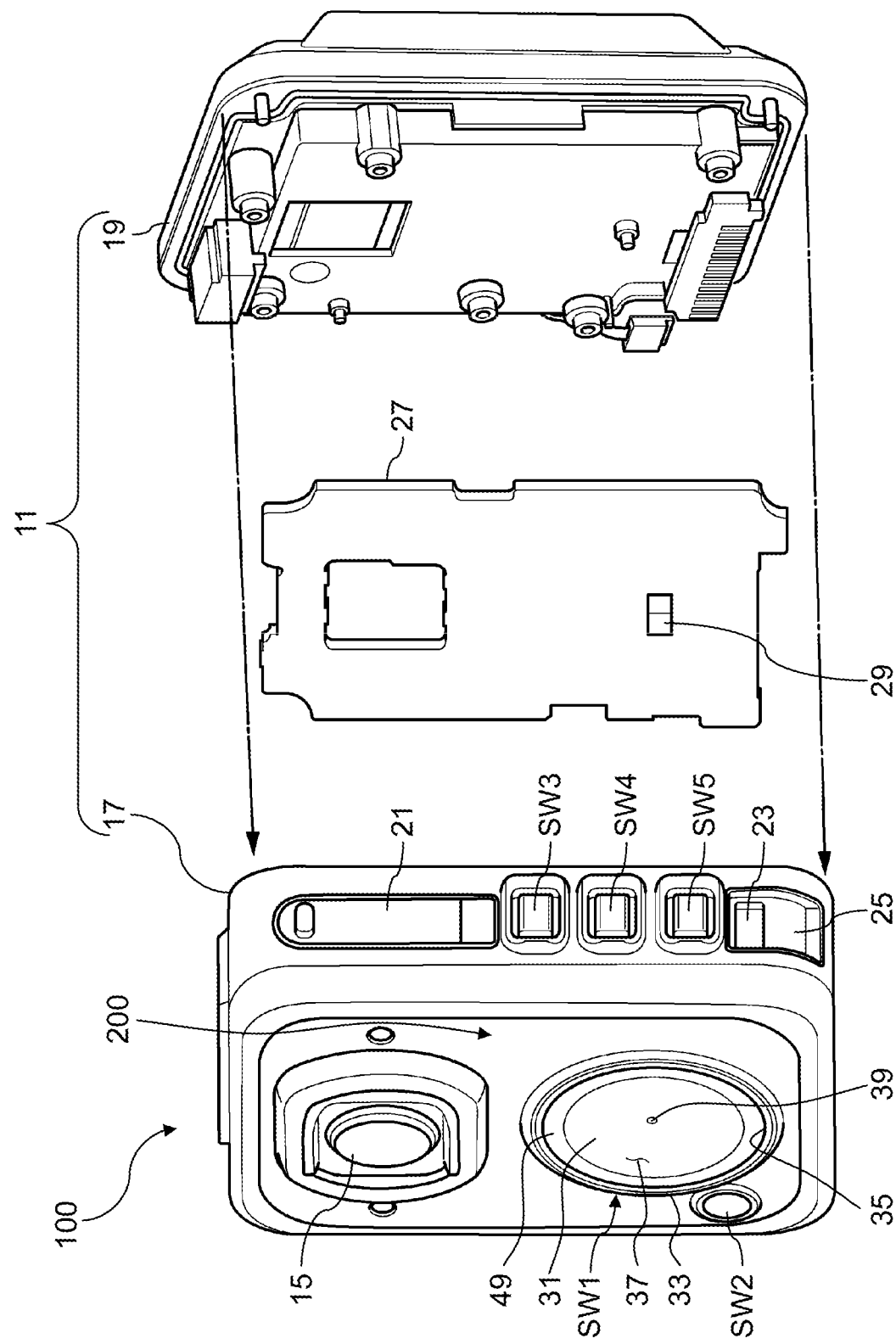
FIG. 2 is an exploded perspective view of the wearable camera of FIG. 1 as viewed from a front side.

FIG. 2 is an exploded perspective view of the wearable camera of FIG. 1 as viewed from a front side.

Wearable camera 100 of the exemplary embodiment includes pressing switch mechanism 200. Pressing switch mechanism 200 is configured of a part of housing 11, board 27, switch portion 29, and operation plate 31.

In housing 11, circular hole 35 that supports outer peripheral edge 33 of operation plate 31 is formed on the front surface. In the configuration example, operation plate 31 is formed in a circular shape in which outer peripheral edge 33 is accommodated in circular hole 35. Operation plate 31 includes bowl-shaped recessed surface 37 that is recessed from the surface of housing 11.

Board 27 is fixed between front-surface housing 17 and rear cover 19 in a state of being sandwiched. Switch portion 29 is fixed to a position facing recessed-surface bottom wall portion 39 of operation plate 31 in board 27.

Figure 3:
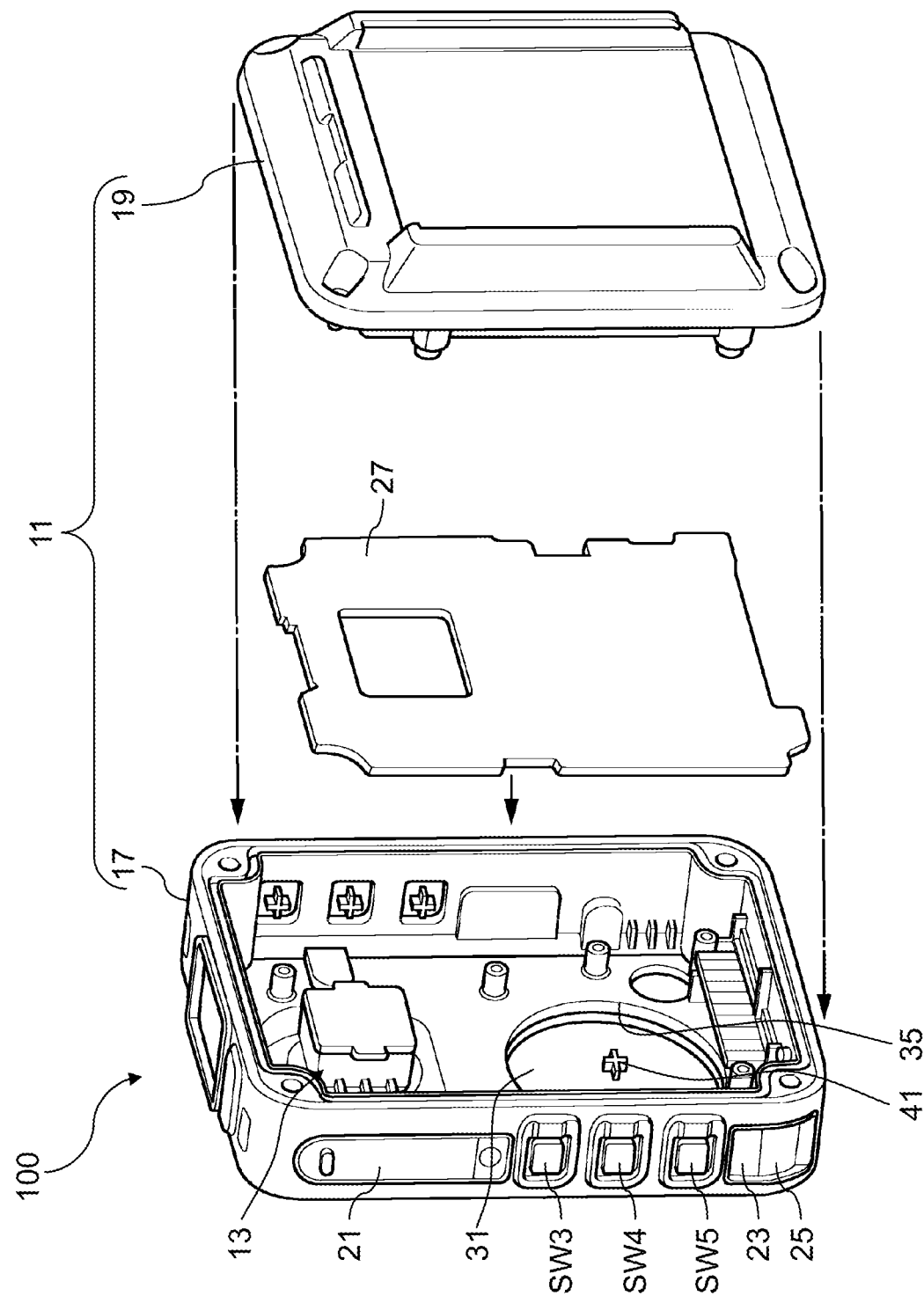
FIG. 3 is an exploded perspective view of the wearable camera of FIG. 1 as viewed from a back side.

FIG. 3 is an exploded perspective view of the wearable camera of FIG. 1 as viewed from a back side.

Operation plate 31 includes pressing protrusion 41 that protrudes toward board 27 in recessed-surface bottom wall portion 39. Pressing protrusion 41 is formed integrally with operation plate 31. Pressing protrusion 41 is in contact with key stem 43 (see FIG. 7) as an example of a pressed portion of switch portion 29 provided in board 27 in a state where board 27 is fixed to front-surface housing 17 and rear cover 19. In the configuration example, pressing protrusion 41 is formed such that a cross sectional shape orthogonal to a protruding direction has a cross shape.

Figure 4:
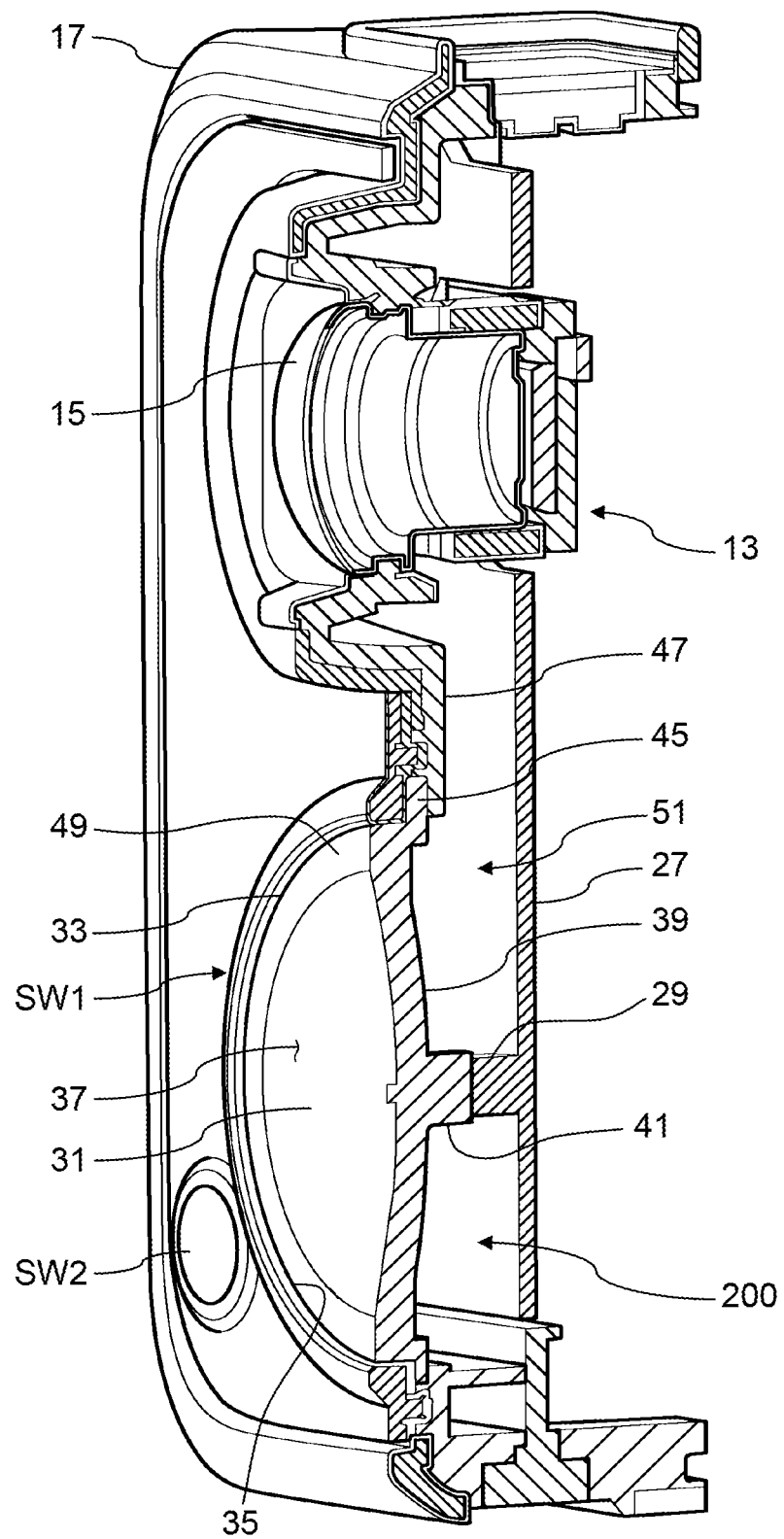
FIG. 4 is a perspective view of a main portion of the wearable camera illustrated in FIG. 1, which is cut out by a vertical virtual plane including a lens optical axis.

FIG. 4 is a perspective view of a main portion of the wearable camera illustrated in FIG. 1, which is cut out by a vertical virtual plane including a lens optical axis.

Operation plate 31 is formed by projecting annular flange portion 45 to outer peripheral edge 33. Flange portion 45 is sandwiched and fixed between front-surface housing 17 and back-side fixing member 47. Moreover, front-surface housing 17 and operation plate 31 may be integrally formed using an elastomer-based resin material (for example, a thermoplastic elastomer). In other words, annular flange portion 45 does not need to be sandwiched and fixed between front-surface housing 17 and back-side fixing member 47.

Annular ring thick portion 49 is formed in the vicinity of outer peripheral edge 33 on a recessed-surface bottom wall portion side of operation plate 31. Ring thick portion 49 is pressed by the fingers of the user (for example, the police officer) so that operation plate 31 is elastically deformed with respect to flange portion 45 of a fixed state. Therefore, an entirety thereof is capable of moving in a direction approaching board 27. Moreover, even if recessed surface 37 of operation plate 31 is pressed by the fingers of the user (for example, the police officer), operation plate 31 is elastically deformed with respect to flange portion 45 of the fixed state and thereby the entirety thereof is capable of moving in the direction approaching board 27.

As described below, operation plate 31 serves as a vibration plate. Therefore, the vibration plate has a structure which is not in contact with other members except that only flange portion 45 is fixed to housing 11 and recessed-surface bottom wall portion 39 is in contact with key stem 43. Therefore, attenuation of the click vibration propagated from switch portion 29 is suppressed. Moreover, an outer peripheral surface of ring thick portion 49 may be in contact with an inner peripheral surface of circular hole 35 of front-surface housing 17.

Operation plate 31 is made of an elastic resin material having rubber elasticity around room temperature. It is desirable that the elastic resin material has a certain degree of flexibility. The flexibility is required to allow elastic deformation of flange portion 45 of the fixed state. As the elastic resin material having a certain degree of flexibility, for example, an elastomer-based resin material (thermoplastic elastomer or the like) can be suitably used. By using an elastic resin material, in addition to watertight sealability, insulation resistance, and heat resistance, adhesiveness and hardness that is equal to or higher than that of a rubber material and equal to or less than that of a PBT material can be easily selected.

For example, when ring thick portion 49 is operated to be pressed, operation plate 31 has to press key stem 43 by recessed-surface bottom wall portion 39. Therefore, when ring thick portion 49 is operated to be pressed, the hardness of operation plate 31 is selected within a range in which a deformation amount does not become excessive and at least recessed-surface bottom wall portion 39 can press key stem 43. Moreover, if the hardness of operation plate 31 is high, it is easy to obtain a high-pitched click sound and if the hardness of operation plate 31 is low, it is easy to obtain a low-pitched click sound.

Figure 5:
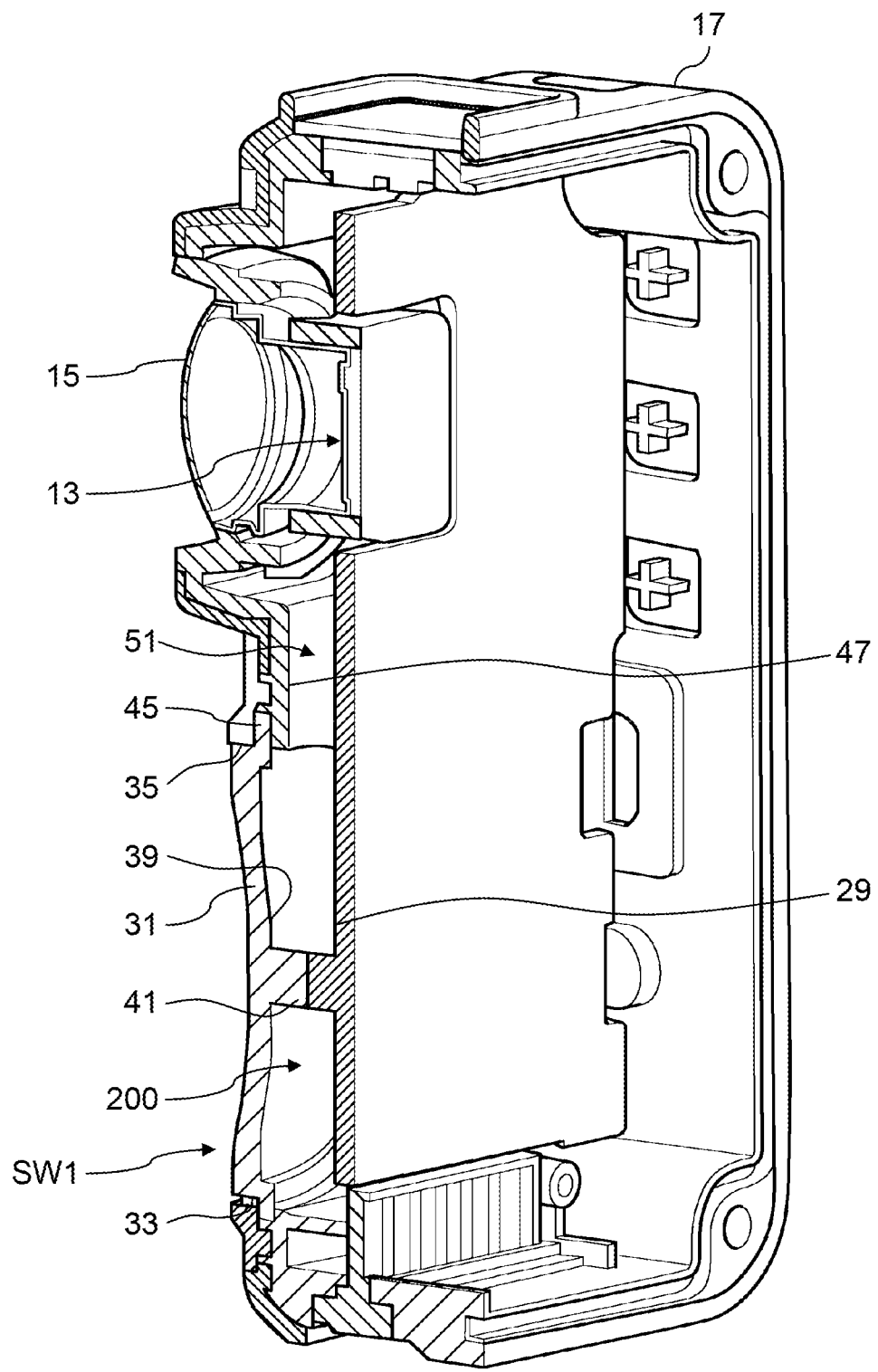
FIG. 5 is a perspective view of a main portion of FIG. 4 as viewed from the back side.

FIG. 5 is a perspective view of a main portion of FIG. 4 as viewed from the back side.

Pressing protrusion 41 protrudes from recessed-surface bottom wall portion 39 of operation plate 31 toward board 27 and is disposed coaxially with key stem 43 of switch portion 29. Board 27 is fixed to front-surface housing 17 with a predetermined strength that does not displace even when a pressing pressure is received from pressing protrusion 41 of operation plate 31. Therefore, the pressing pressure of operation plate 31 is efficiently input to switch portion 29 as a pressing force of key stem 43.

Figure 6:
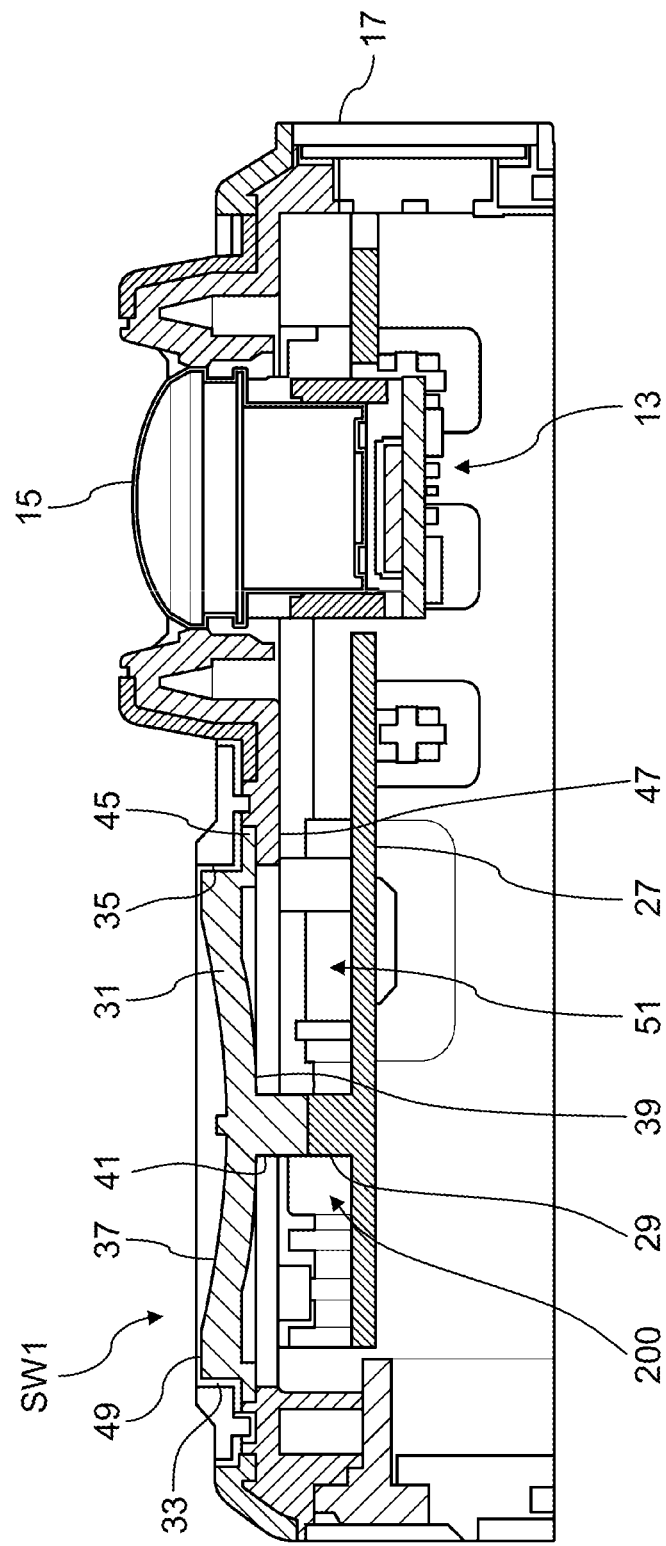
FIG. 6 is a side view of main portions of a housing, a board, and an operation plate of the wearable camera illustrated in FIG. 1, which are cut out by the vertical virtual plane.

FIG. 6 is a side view of main portions of the housing, the board, and the operation plate of the wearable camera illustrated in FIG. 1, which are cut out by the vertical virtual plane.

Front-surface housing 17 supports board 27 at a position separated from operation plate 31 by a predetermined distance. Since board 27 is formed in a substantially flat plate shape, non-sealed space 51 having a predetermined volume is defined between front-surface housing 17 and board 27. Non-sealed space 51 functions as a resonance box (in other words, a reverberation space) of the click sound generated by switch portion 29. Moreover, non-sealed space 51 may not be strictly classified into whether it is in a non-sealed state or a sealed state as long as non-sealed space 51 has a volume capable of serving as the resonance box of the click sound.

Figure 7:
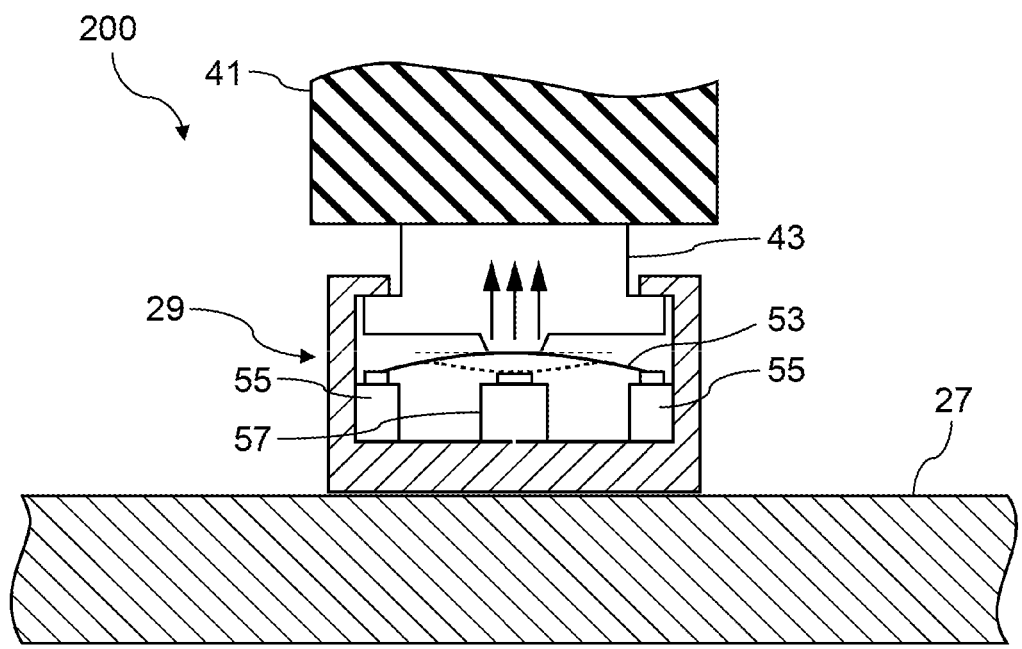
FIG. 7 is an enlarged sectional view of the vicinity of a switch portion illustrated in FIG. 6.

FIG. 7 is an enlarged sectional view of the vicinity of the switch portion illustrated in FIG. 6.

Switch portion 29 has a tactile feedback mechanism. The tactile feedback mechanism is fixed to board 27 and presses key stem 43 in the direction approaching board 27, thereby generating the click feeling.

In switch portion 29 including the tactile feedback mechanism, since movable contact 53 has a disk-like inverted dome shape, when movable contact 53 is pressed via key stem 43, a center portion of movable contact 53 which is connected to first fixed contact 55 is in contact with second fixed contact 57. As a result, first fixed contact 55 and second fixed contact 57 are conductively connected via movable contact 53.

In this case, due to a jumping phenomenon of a dome-shaped leaf spring configuring movable contact 53, switch portion 29 can obtain the click feeling by a concave characteristic in the middle with respect to a moving amount by an operation force, that is a so-called tactile feedback mechanism. Such a mechanical contact type switch portion 29 has a small operation amount and can obtain a sharp click feeling and the operation sound. In pressing switch mechanism 200 of the configuration example, the click vibration causing the click feeling and the operation sound is transmitted from key stem 43 to pressing protrusion 41 and propagates through operation plate 31 in a radial direction.

Next, an operation of wearable camera 100 of the exemplary embodiment will be described.

In pressing switch mechanism 200 according to the exemplary embodiment, when recessed surface 37 of operation plate 31 is pressed, recessed-surface bottom wall portion 39 moves in the direction approaching board 27 and presses key stem 43 of switch portion 29. In switch portion 29, when key stem 43 is pressed, the click vibration and the click sound are generated by the tactile feedback mechanism. The click vibration and the click sound generated in switch portion 29 are transmitted to recessed-surface bottom wall portion 39 of operation plate 31 via key stem 43, as illustrated by upward arrows in FIG. 7, thereby vibrating operation plate 31. Operation plate 31 including recessed surface 37 operates in the same manner as a vibration plate of a cone type speaker by vibrating recessed-surface bottom wall portion 39.

That is, the click vibration from key stem 43 first vibrates recessed-surface bottom wall portion 39. Vibrated recessed-surface bottom wall portion 39 vibrates air which is in contact with a bottom portion of the recessed surface. The vibration of the air propagates and efficiently (attenuation is suppressed) diffuses in the radial direction while vibrating an air layer gradually becoming thinner radially outward by being in contact with recessed surface 37. Therefore, the click sound emitted by vibrating operation plate 31 is louder than that of switch portion 29 of a single unit in which operation plate 31 is not provided as the vibration plate.

In this manner, in operation plate 31, the click vibration and the click sound efficiently proceed from recessed-surface bottom wall portion 39 in the radial direction. The click sound is also emitted from recessed surface 37 with a larger sound than switch portion 29 of the single unit together with echo in non-sealed space 51 which is described above. In addition, the click vibration also propagates through operation plate 31 and is efficiently transmitted to the fingers pressing operation plate 31.

In operation plate 31, the click vibration from key stem 43 is first transmitted (input) to pressing protrusion 41 of recessed-surface bottom wall portion 39 initially. Thereafter, as described above, the click vibration propagates through operation plate 31 in the radial direction while vibrating the air layer. Therefore, the pressing operation of operation plate 31 can vibrate the air layer more in pressing the vicinity of the outer peripheral edge of operation plate 31 with the fingers than in pressing recessed-surface bottom wall portion 39 of recessed surface 37 by being in contact with the fingers, so that a large click sound can be obtained.

In addition, since operation plate 31 is exposed as recessed surface 37 on the surface of housing 11, malfunction of pressing switch mechanism 200 caused by hitting another member or the like can be prevented compared to a case where operation plate 31 is exposed on the same plane as the surface of housing 11.

In addition, in pressing switch mechanism 200, outer peripheral edge 33 of operation plate 31 has a circular shape, so that a distance from a center of operation plate 31 to outer peripheral edge 33 is the same from any direction. Therefore, operation plate 31 can obtain substantially the same click vibration and click sound from any direction by pressing the vicinity of outer peripheral edge 33.

In addition, in pressing switch mechanism 200, since pressing protrusion 41 is included in recessed-surface bottom wall portion 39, the pressing force applied to an arbitrary position of operation plate 31 is concentrated on pressing protrusion 41. Therefore, the pressing force can be input to key stem 43 of switch portion 29 at a pinpoint. In addition, pressing switch mechanism 200 can easily propagate the click vibration transmitted from key stem 43 equally in the radial direction of operation plate 31 by providing pressing protrusion 41.

Furthermore, in pressing switch mechanism 200, by using the elastic resin material for operation plate 31, in addition to watertight sealability, insulation resistance, and heat resistance, adhesiveness and hardness that is equal to or higher than that of the rubber material and equal to or less than that of the PBT material can be easily selected. In a case where operation plate 31 has a high hardness, a high-pitched click sound is easily obtained. Conversely, in a case where the hardness thereof is low, a low-pitched click sound is easily obtained. Operation plate 31 can easily select the hardness by which an optimum click sound is obtained in addition to the above-described various favorable characteristics by using the elastic resin material.

In wearable camera 100 according to the exemplary embodiment, the click sound is emitted from recessed surface 37 with a sound larger than that of switch portion 29 of the single unit by providing pressing switch mechanism 200. The click vibration also propagates through operation plate 31 and is efficiently transmitted to the fingers pressing operation plate 31. Therefore, the user operating operation plate 31 can simultaneously obtain both clear click sound and clear click feeling.

Therefore, according to pressing switch mechanism 200 of the exemplary embodiment, the click feeling and the operation sound can be generated with high efficiency and a simple structure.

In addition, according to wearable camera 100 of the exemplary embodiment, a user's difficulty in knowing whether or not the switch operation is performed can be reduced under various situations.

While various exemplary embodiments are described with reference to the drawings, it goes without saying that the disclosure is not limited to such examples. It will be apparent to those skilled in the art that various modification examples or correction examples can be conceived within the scope of the claims, and it is understood that those naturally belong to the technical scope of the disclosure. Further, each configuration element in the above exemplary embodiment may be arbitrarily combined within the scope not deviating from the gist of the disclosure.

For example, in the above configuration example, the operation plate is described as the elastic resin material, but the operation plate of the pressing switch mechanism according to the disclosure may be a metal. In the above configuration example, the case where the operation plate has the circular shape is described as an example, but in the pressing switch mechanism according to the disclosure, the operation plate may be a polygon such as an ellipse, a quadrangle, a hexagon, or an octagon. In the above-described configuration example, the case where the pressing switch mechanism is applied to the wearable camera is described, but the same effect can be obtained even if the pressing switch mechanism according to the disclosure is used for other devices such as a camera, a video camera, and an IC recorder.

The disclosure is useful as a pressing switch mechanism and a wearable camera in which a click feeling and an operation sound are generated with high efficiency and a simple structure, and a user's difficulty in knowing whether or not a switch operation is performed is reduced under various situations.

What is claimed is:

1. A wearable camera comprising:
   a housing;
   a board disposed in the housing;
   a capture that is disposed on a front surface of the housing and, which, in operation, images an object;
   a recording switch that is disposed on the front surface of the housing and, which, in operation, receives an imaging start operation from a user;
   a space having a predetermined volume provided between the board and the recording switch; and
   a switch portion fixed to the board that starts recording of the capture by the imaging start operation of the recording switch,
   wherein when the imaging start operation is input, the recording switch propagates a click sound and a click vibration of the switch portion, and the recording switch vibrates.

2. The wearable camera of claim 1,
   wherein the capture is positioned at an upper portion of the front surface of the housing, and
   wherein the recording switch is positioned at a lower portion of the front surface of the housing.

3. The wearable camera of claim 1,
   wherein the recording switch is disposed to have a largest area on the front surface of the housing.

4. The wearable camera of claim 1,
   wherein the recording switch includes an outer peripheral edge formed in a circular shape, and
   wherein the outer peripheral edge is accommodated in a circular hole formed in the housing and supported by the housing.

5. The wearable camera of claim 1,
   wherein the recording switch includes an outer peripheral edge formed in a polygonal shape, and
   wherein the outer peripheral edge is accommodated in and supported by the housing.

6. The wearable camera of claim 4,
   wherein the recording switch and the outer peripheral edge are formed integrally with and supported by the housing using an elastomer-based resin material.

7. The wearable camera of claim 4,
   wherein the recording switch includes an annular flange portion on the outer peripheral edge, and
   wherein the annular flange portion is fixed to and supported by the housing.

8. The wearable camera of claim 4,
   wherein the recording switch includes an annular ring thick portion in a vicinity of the outer peripheral edge and a flange portion,
   wherein when the recording switch is pressed down, the annular ring thick portion is elastically deformed with respect to the flange portion, and
   wherein the recording switch approaches the board.

9. The wearable camera of claim 4,
   wherein the recording switch includes a bowl-shaped recessed surface that is recessed from a surface of the housing and is freely bent in a direction approaching the board.

10. The wearable camera of claim 1,
    wherein the recording switch is made of an elastic resin material having a rubber elasticity around a room temperature.

11. The wearable camera of claim 1,
    wherein the recording switch is made of a metal member.

12. The wearable camera of claim 1,
    wherein the board is fixed in a sandwiched state between the housing and a housing back lid, and
    wherein the switch portion is fixed to the board at a position facing a bottom wall portion of a recessed surface of the recording switch.

13. The wearable camera of claim 1,
    wherein the board is fixed at a position separated from the recording switch by a predetermined distance.

14. The wearable camera of claim 1,
    wherein a bottom wall portion of a recessed surface of the recording switch includes a pressing protrusion that protrudes toward the board, and wherein the pressing protrusion is in contact with a pressed portion of the switch portion in a state where the board is fixed between the housing and a housing back lid.

15. A wearable camera comprising:
a housing;
a housing back lid;
a board disposed in the housing and is fixed in a sandwiched state between the housing and the housing back lid;
a capture that is disposed on a front surface of the housing and images an object;
a recording switch that is disposed on the front surface of the housing and, which, in operation, receives an imaging start operation from a user; and
a switch portion fixed to the board that starts recording of the capture by the imaging start operation of the recording switch, the switch portion is fixed to the board at a position facing a bottom wall portion of a recessed surface of the recording switch of the board,
wherein when the imaging start operation is input, the recording switch propagates a click sound and a click vibration of the switch portion, and the recording switch vibrates.

16. A wearable camera comprising:
a housing;
a board that is disposed in the housing;
a capture that is disposed on a front surface of the housing and images an object;
a recording switch that is disposed on the front surface of the housing and, which, in operation, receives an imaging start operation from a user, the recording switch includes an outer peripheral edge, a flange portion, and an annular ring thick portion in a vicinity of the outer peripheral edge; and
a switch portion fixed to the board that starts recording of the capture by the imaging start operation of the recording switch,
wherein when the imaging start operation is input, the recording switch propagates a click sound and a click vibration of the switch portion, and vibrates,
wherein when the recording switch is pressed down, the annular ring thick portion is elastically deformed with respect to the flange portion and the recording switch approaches the board.

* * * * *